United States Patent [19]

Mahil et al.

[11] Patent Number: 5,004,768
[45] Date of Patent: Apr. 2, 1991

[54] ADHESIVE COMPOSITIONS AND SELF-ADHESIVE SHEET MATERIALS

[75] Inventors: Mahinder S. Mahil, Thorley; John M. Cruden, Harlow, both of England

[73] Assignee: Harlow Chemical Company Limited, Essex, England

[21] Appl. No.: 214,291

[22] Filed: Jul. 1, 1988

[30] Foreign Application Priority Data

Jul. 3, 1987 [GB] United Kingdom ............... 8715736

[51] Int. Cl.$^5$ ................... C08L 3/02; C08L 5/16
[52] U.S. Cl. .................................. 524/30; 524/48
[58] Field of Search ....................... 524/30, 48

[56] References Cited

U.S. PATENT DOCUMENTS

| | | | |
|---|---|---|---|
| 2,808,381 | 10/1957 | Stone | 524/48 |
| 2,976,178 | 3/1961 | Pahl et al. | 524/48 |
| 3,200,091 | 8/1965 | Sederlund et al. | 524/48 |
| 3,365,320 | 1/1968 | Minelli | 524/48 |
| 3,684,749 | 8/1972 | Arai et al. | 524/18 |
| 3,692,713 | 9/1972 | Columbus et al. | 524/47 |

FOREIGN PATENT DOCUMENTS

| | | |
|---|---|---|
| 57-021467 | 2/1982 | Japan . |
| 58-222170 | 12/1984 | Japan . |
| 888487 | 1/1962 | United Kingdom . |
| 919682 | 2/1963 | United Kingdom . |
| 931681 | 7/1963 | United Kingdom . |
| 1121131 | 7/1968 | United Kingdom . |
| 1278813 | 6/1972 | United Kingdom . |
| 1421494 | 1/1976 | United Kingdom . |
| 1459554 | 12/1976 | United Kingdom . |
| 1594120 | 7/1981 | United Kingdom . |

*Primary Examiner*—Nathan M. Nutter
*Attorney, Agent, or Firm*—Merchant, Gould, Smith, Edell, Welter & Schmidt

[57] ABSTRACT

Self-adhesive sheet materials may be made by applying to the surface of a sheet an adhesive composition comprising the polymer of an acrylic ester of a saturated alcohol with two to twelve carbon atoms, a surfactant, and dextrin. When the proportion of dextrin is within the range of 4 to 30% by weight, based on the weight of the components specified, and especially when the alcohol has at least four carbon atoms, the adhesive provides pressure-sensitive, releasable, articles, e.g., label or tapes.

5 Claims, No Drawings

ADHESIVE COMPOSITIONS AND SELF-ADHESIVE SHEET MATERIALS

This invention relates to surface coating compositions and products employing them. More especially, it relates to compositions suitable for use as pressure sensitive adhesives, and to sheet materials having such a composition on a surface thereof In recent years, the use of removable selfadhesive films and papers, for example, tapes, labels, memorandum pads, and price tags, has increased markedly. Such adhesives are normally supplied to the user in organic solutions; and most are based on tackified natural rubber. Many have the disadvantage, however, that after the adhesive film or paper has been in place on a substrate for some time, the strength of the bond increases to an extent that the film or paper cannot be readily removed from the substrate, or cannot be removed without damage to the substrate surface.

There accordingly remains a need for an adhesive composition, especially a pressure-sensitive adhesive composition, not requiring an organic solvent, and which provides self-adhesion the bond strength of which does not increase to an undesirable extent with time.

The present invention provides a sheet having on a surface thereof a layer of a composition comprising dextrin, a surfactant, and a polymer at least some of the repeating units of which are derivable from an acrylate of at least one saturated aliphatic alcohol having from two to twelve carbon atoms. The invention also provides a process for making a self-adhesive sheet which comprises applying a coating of the composition if desired or required in the form of a solution or dispersion, to a surface of the sheet and if desired or required causing or allowing any solvent to evaporate therefrom, to form an adhesive coating. Advantageously, the composition is free, or substantially free, from any organic solvent. Advantageously, the composition is on one surface only of the sheet, and may be on part or parts only of that surface.

The invention also provides a sheet material bonded to a substrate by the composition.

The invention further provides an adhesive composition comprising dextrin, a surfactant, and a polymer at least some of the repeating units of which are derivable from, and preferably are derived from, an acrylate of at least one saturated aliphatic alcohol having from 4 to 12 carbon atoms. Preferably, said acrylate is either 2-ethyl hexyl acrylate or n-butyl acrylate, alone or in admixture with one another or with an acrylate of one or more other saturated aliphatic alcohols having from 2 to 12 carbon atoms.

Also provided by the invention is the use of the above-defined compositions as an adhesive coating on a surface of a sheet.

As used in this specification, including the claims, the term "sheet" relates to an article of which one dimension is small compared with the other two, and more especially relates to any continuous sheet or film. As examples of such sheet, there may be mentioned tapes and labels. The materials of which the sheets are constructed may be, for example, paper, metal, e.g., aluminum, or plastics materials, whether natural, semi-synthetic or synthetic, e.g., polyester, plasticized polyvinyl chloride, polypropylene, or cellulose-based (cellulose esters or ethers being examples of the latter).

The composition may conveniently be made by a process which comprises polymerizing an acrylic ester of one or more saturated aliphatic alcohols having from two to twelve carbon atoms in the presence of a surfactant and dextrin.

Advantageously, the surfactant is present in the composition in a proportion of from 1 to 15, preferably from 5 to 10, percent by weight, based on the total weight of the polymer, dextrin and surfactant. The surfactant is advantageously an anionic or, preferably, a nonionic surfactant. As anionic surfactants there may be mentioned, for example, alkyl sulfates, alkyl sulphonates, alkyl aryl sulphonates, alkyl polyether sulfates, alkyl aryl polyether sulfates, sulphosuccinic acid esters and alkyl aryl polyether phosphates. As examples of non-ionic surfactants there may be mentioned condensates of ethylene oxide with alkyl phenols or fatty alcohols and block copolymers of ethylene and propylene oxides.

The polymer is advantageously present in the composition in a proportion of from 65 to 95, preferably from 75 to 90, percent by weight, based on the weight of polymer, dextrin and surfactant. Units derivable from, and advantageously derived from, the acrylic ester of an alcohol with from two to twelve, advantageously from four to twelve, preferably from four to eight, carbon atoms advantageously constitute a major proportion, and preferably at least 75% by weight, of the polymer chain and the polymer chain may consist of such units. The units may be derived from one or more such monomers, and a homopolymer, or a copolymer of two such monomers, is preferred. The alcohols are advantageously straight or branched chain aliphatic alcohols, are advantageously monohydroxy alcohols, and are advantageously free from other functional substituent groups. Examples of suitable alcohols include ethyl, n-butyl, 2-ethyl hexyl, and lauryl alcohols. Suitable copolymers may be derived from butyl and 2-ethyl hexyl acrylates, from lauryl and 2-ethyl hexyl acrylates, and from ethyl and 2-ethyl hexyl acrylates.

The polymer may, however, also include units derivable from, and advantageously derived from, other ethylenically unsaturated monomers to confer properties on the adhesive composition of value in particular end uses. The monomers include, for example, esters of acrylic acid with alcohols having thirteen or more carbon atoms; esters of methacrylic acid with alcohols with one to eighteen carbon atoms, especially methyl methacrylate; methyl acrylate; mono- and di-esters of fumaric, maleic and itaconic acids; vinyl esters of saturated carboxylic acids with two to eighteen carbon atoms, especially vinyl acetate and propionate; aromatic vinyl monomers, for example, styrene; acrylonitrile and methacrylonitrile.

Monomers with certain functional groups, for example carboxyl, hydroxyl, and amide groups, may be included at levels of up to 5% of total monomer, although they may tend to increase the adhesion of the composition to certain polar substrates. As examples of such monomers there may be mentioned acrylic acid, methacrylic acid, itaconic acid, hydroxyethyl and hydroxypropyl acrylates and methacrylates; acrylamide, methacrylamide and their N-methylol derivatives and the alkyl ethers of these N-methylol derivatives. The oligomer condensates of acrylic or methacrylic acid with two or more moles of ethylene or propylene oxide may also be used.

Low levels, typically 0.1% to 0.3% of total monomer, may be included of monomers with two or more polymerizable ethylenic double bonds. These may be incorporated to increase the overall molecular weight of the polymer and thereby increase the toughness. If used at too high a level such monomers may impair adhesive properties. Typical polyfunctional monomers include divinyl benzene, ethylene glycol dimethacrylate, trimethylol propane triacrylate, allyl acrylate and diallyl maleate.

Monomers containing the sulphonate, sulfate or phosphate group may be included with advantage, since the mechanical stability of the resulting polymer in dispersion is improved—examples of such monomers include sodium vinyl sulphonate, sodium styryl sulphonate and amidoacryl propane sulphonic acid.

The dextrin is advantageously present in a proportion within the range of 4 to 30 percent by weight, preferably 7 to 15 percent by weight, based on the weight of the polymer, surfactant, and dextrin. Below 4%, the peelability of a self-adhesive article is excessively reduced while above 30% the adhesion level is reduced. Advantageously the dextrin is one obtainable by the hydrolysis of potato starch, since the composition in the form of an aqueous dispersion remains workable within a wide temperature range when such a dextrin is used. Materials employing dextrins obtainable from other starches are, however, also within the scope of the invention. Advantageously, the dextrin has a viscosity, at 25° C. in a 37% by weight aqueous solution, of at most 100 mPa s. measured in an Ostwald viscometer. Suitable commercially available potato starch dextrins include those sold under the trade marks EMDEX and AVEDEX, especially Emdex 30 An 45 and Avedex 36 LAC 14G.

It is believed that when the composition of the invention is manufactured by the preferred process mentioned above that a chemical bond is formed between at least some of the dextrin and at least some of the polymer molecules, forming, for example, a graft copolymer. The values given for the proportions of components stated herein to be advantageous or preferred, however, disregard this possibility.

The manufacture of the composition may be carried out in any manner suitable for preparing acrylic polymers, emulsion polymerization being preferred. As polymerization initiators, there may be mentioned ammonium or alkali metal persulphates, and watersoluble redox catalyst systems, for example hydrogen peroxide or t-butyl hydroperoxide with sodium bisulfate or sodium formaldehyde sulphoxylate. The reaction mixture may contain other components, e.g., additional stabilizers or other natural or synthetic colloids. Polymerization temperatures will depend to a large extent on the initiator chosen, but will normally be in the range of from 50° C. to 90° C. The polymer advantageously has a weight average molecular weight of at least 100,000 if a composition that does not increase excessively in adhesive strength with time is required.

The resulting dispersion may be employed directly as a coating composition, and advantageously has a solids content of at least 35%, preferably at least 45%, by weight. The dispersion may be employed without further additives, but other components may be incorporated to achieve specific properties, for example, tackifying resins, colorants, antioxidants, bactericides, fungicides, or additional solvents.

The dispersion may be applied to the surface of the article by any technique suitable for applying pressure sensitive adhesives to a surface.

The following examples illustrate the invention:

EXAMPLE 1

Example 1

| | | |
|---|---|---|
| Water | 38.00 | |
| Dextrin (Emdex 30 An 45) | 5.00 | |
| Synperonic ® NP12 | 1.00 | Charge I |
| Aerosol MA | 0.20 | |
| n-Butyl Acrylate | 22.00 | Charge II |
| 2-Ethyl Hexyl Acrylate | 21.14 | |
| t-Butyl Hydroperoxide | 0.02 | |
| Sodium Formaldehyde Sulphoxylate | 0.01 | Initiator I |
| Water | 0.09 | |
| Synperonic NP30 | 2.00 | |
| Dowfax ® 2A1 | 1.00 | Charge III and |
| Ammonium Persulphate | 0.12 | Initiator II |
| Water | 9.10 | |
| t.Butyl Hydroperoxide | 0.02 | |
| Sodium Formaldehyde Sulphoxylate | 0.02 | Initiator III |
| Water | 0.18 | |
| Proxel ® GXL | 0.10 | |
| | 100.00 | |

Synperonic NP12 and NP30 are condensates of nonyl phenol with respectively 12 and 30 moles of ethylene oxide. Aerosol MA is sodium dihexyl sulphosuccinate. Dowfax 2Al is disodium dodecyl diphenyl ether. Proxel GXL is a bactericide.

A reaction vessel provided with a propeller agitator was charged with water, dextrin and the initial surfactants (Charge I). This initial charge was heated to 40° C. and when the dextrin was dissolved 10% of the mixed butyl acrylate and 2-ethyl hexyl acrylate (Charge II) was added to the reactor. When the monomers had been homogenized in the dextrin/surfactant solution, t.butyl hydroperoxide and sodium formaldehyde sulphoxylate (Initiator I) were added separately.

The initial monomer charge polymerized leading to an increase in temperature in the reaction vessel to about 50° C. The charge was then heated to 80° C. and at this temperature the remainder of Charge II and the delayed surfactant/initiator solution (Charge III and Initiator II) were added over a period of four hours thirty minutes. The temperature was maintained at 80° C. for a further hour and the emulsion was then cooled. The final separate additions of t.butyl hydroperoxide and sodium formaldehyde sulphoxylate solution (Initiator III) were then made to reduce free monomer levels, followed by the preservative Proxel GXL.

A latex was obtained having the following physical properties:
Solids Content: 51.4%
pH: 2.5
Viscosity RVT 4/20: 25 poise
Particle Size: 120 nm
Coagulum: 0.01%

EXAMPLE 2

A latex was prepared according to the procedure of Example 1, except that Charge II included methacrylic acid. The ratio of the monomers used was butyl acrylate - 50%, 2-ethyl hexyl acrylate - 49%, methacrylic acid - 1%.

The latex obtained had the following physical properties:
Solids Content: 51.1%
pH: 2.3

Viscosity RVT 4/20: 16 poise
Particle Size: 135 nm
Coagulum: 0.06%

EXAMPLE 3 (COMPARISON)

A latex was prepared by substantially the same procedure as Example 2, but omitting the dextrin. This latex had the following properties:
Solids Content: 50.0%
pH: 2.4
Viscosity RVT 4/20: 33 poise
Particle Size: 85 nm
Coagulum: 0.35%

The lattices prepared in Examples 1-3 were then evaluated for their adhesive properties. Two commercial products sold as peelable adhesives were used as controls. One of these was an acrylic latex and the second a solution of a compound based on natural rubber.

The various products were coated on standard 80 g/m² White Vellum for evaluation after dilution to achieve an average coating weight of 18 g/m². The coatings were dried at 70° C. for five minutes then conditioned for twenty-four hours at 23° C. and 70% relative humidity, before being cut into strips of 25 mm width, which were applied to glass for adhesion testing 180° angle peel adhesion values were measured immediately and after conditioning overnight and for one week at 60° C. The following results were obtained in Newtons per 25 mm.

TABLE 1

| | Commercial Solvent/ Rubber System | Commercial Acrylic Latex | Example 1 | Example 2 | Example 3 |
|---|---|---|---|---|---|
| Initial Peel Adhesion | 1.25 | 7.5 | 2.25 | 2.50 | 14.00 |
| 24 Hour Peel Adhesion | 2.50 | 9.0 | 2.90 | 4.80 | 16.00 |
| 7 Day Peel Adhesion | 3.75 | 16+ (PF) | 8.70 | 5.20 | (PF) |

PF - Paper Failure.

From the results above, it may be seen that the presence of the dextrin greatly improved the ease of removability of the latex based acrylic products.

EXAMPLES 4, 5, 6

The procedures of Example 1 were followed but, to produce homopolymers, Charge II consisted of 2-ethyl hexyl acrylate (2-E.H.A.), n-butyl acrylate (B.A.) and ethyl acrylate (E.A.) respectively. The adhesive results obtained were as follows:

TABLE 2

| Peel Adhesion | Example 4 2-E.H.A. | Example 5 B.A. | Example 6 E.A. |
|---|---|---|---|
| Initial | 5.00 | 5.00 | 5.00 |
| 24 hours | 6.15 | 6.50 | 5.35 |
| 7 days | 15.50 | 10.25 | 14.00 |

EXAMPLES 7-12

The procedures of Example 1 were followed, Charge II being:
Ex. 7—Butyl Acrylate - 47.5%, 2-Ethyl Hexyl Acrylate - 47.5%, Methyl Methacrylate - 5%.
Ex. 8—Butyl Acrylate - 47.5%, 2-Ethyl Hexyl Acrylate - 47.5%, Styrene - 5%.
Ex. 9—Butyl Acrylate - 47.5%, 2-Ethyl Hexyl Acrylate - 47.5%, Dibutyl Maleate - 5%.
Ex. 10—Butyl Acrylate - 40%, 2-Ethyl Hexyl Acrylate - 40%, Dibutyl Maleate - 20%.
Ex. 11—Butyl Acrylate - 40%, 2-Ethyl Hexyl Acrylate - 40%, Ethyl Acrylate - 20%
Ex. 12—Butyl Acrylate - 45%, 2-Ethyl Hexyl Acrylate - 45%, VeoVa 10 - 10%.

VeoVa is the vinyl ester of mixed tertiary $C_{10}$ carboxylic acids; n-butyl acrylate used in each case.

The peel adhesion results were as follows

TABLE 3

| | Initial Peel | 24-Hour Peel | 7-Day Peel |
|---|---|---|---|
| Ex. 7 | 1.5 | 6.8 | P.F. |
| Ex. 8 | 3.8 | 12.8 | P.F. |
| Ex. 9 | 0.6 | 1.5 | 9.5 |
| Ex. 10 | 0.3 | 1.0 | 15.75 |
| Ex. 11 | 4.85 | 5.20 | 9.50 |
| Ex. 12 | 2.5 | 4.25 | 15.25 |

The effect of hardening monomers, methyl methacrylate and styrene, is seen to be deleterious to adhesives intended to be peelable.

EXAMPLES 13-17

The procedures of Example 1 are followed save for changes in the surfactant system.

The changes were as follows:
13. Dowfax 2A1 replaced by Perlankrol RN75 ®.
14. Dowfax 2A1 replaced by Abex 18S ®.
15. Dowfax 2A1 replaced by Aerosol 102 ®.
16. Both Dowfax 2A1 and Aerosol MA omitted. Only nonionic surfactants used.
17. Both nonionic surfactants omitted Dowfax 2A1 replaced by Aerosol MA.

Perlankrol RN75 is the sodium salt of a sulfated condensate of nonyl phenol and ethylene oxide. Abex 18S is the sodium salt of an ethoxylated fatty alcohol. Aerosol 102 is the disodium salt of the monoester of sulphosuccinic acid with an ethoxylated fatty alcohol.

The peel adhesions were as follows:

TABLE 4

| | Initial Peel | 24-Hour Peel | 7-Day Peel |
|---|---|---|---|
| Ex. 1 | 2.25 | 2.50 | 8.00 |
| Ex. 13 | 4.80 | 5.00 | 9.50 |
| Ex. 14 | 3.80 | 4.20 | 8.50 |
| Ex. 15 | 2.50 | 2.80 | 10.00 |
| Ex. 16 | 0.60 | 0.50 | 8.00 |
| Ex. 17 | 14.75 | 15.25 | 13.00 |

EXAMPLES 18, 19, 20

These were identical to Example 1 save that the level of dextrin used was varied. The levels were as follows: Example 18 - 3.5%, Example 19 - 10%, Example 20 - 15% (all based on the total weight of dispersion). The water levels in these lattices were varied to maintain the same solids content as in Examples 1 and 2. The adhesion results were as follows:

TABLE 5

| | Initial Peel | 24-Hour Peel | 7-Day Peel |
|---|---|---|---|
| Ex. 18 | 4.00 | 4.00 | 5.40 |
| Ex. 19 | 5.00 | 6.00 | 12.20 |
| Ex. 20 | 6.00 | 10.50 | 15.50 |

What we claim is:

1. A composition comprising: from 4% to 30% dextrin, from 1% to 15% of a surfactant and from 65% to 95% of a polymer having at least 75% by weight of its repeating units derived from an acrylate of at least one saturated aliphatic alcohol having from 4 to 12 carbon atoms, the percentages being by weight, based on the total weight of dextrin, surfactant and polymer, and the composition being capable of acting as a pressure-sensitive adhesive.

2. A composition as claimed in claim 1 in the form of an aqueous dispersion.

3. A self adhesive sheet, having a composition as claimed in claim 1 on at least one surface.

4. A composition according to claim 1 wherein the polymer consists essentially of repeating units derived from the acrylate.

5. A composition according to claim 1 wherein a major proportion of the units of the polymer are derived from an acrylate of at least one saturated aliphatic alcohol having from 4 to 8 carbon atoms.

* * * * *